(12) United States Patent
Matenaar et al.

(10) Patent No.: US 8,925,077 B2
(45) Date of Patent: Dec. 30, 2014

(54) MOBILE DEVICES WITH INHIBITED APPLICATION DEBUGGING AND METHODS OF OPERATION

(71) Applicants: Felix Matenaar, San Francisco, CA (US); Jeffrey Forristal, San Francisco, CA (US)

(72) Inventors: Felix Matenaar, San Francisco, CA (US); Jeffrey Forristal, San Francisco, CA (US)

(73) Assignee: Bluebox Security, Inc., San Francisco, CA (US)

( * ) Notice: Subject to any disclaimer, the term of this patent is extended or adjusted under 35 U.S.C. 154(b) by 0 days.

(21) Appl. No.: 14/203,869

(22) Filed: Mar. 11, 2014

(65) Prior Publication Data

US 2014/0259162 A1 Sep. 11, 2014

Related U.S. Application Data

(60) Provisional application No. 61/776,689, filed on Mar. 11, 2013.

(51) Int. Cl.
*H04L 29/06* (2006.01)
*G06F 21/52* (2013.01)

(52) U.S. Cl.
CPC .................................... *G06F 21/52* (2013.01)
USPC .......................................................... 726/22

(58) Field of Classification Search
CPC ... G06F 21/14; G06F 21/577; G06F 9/30145; G06F 11/362; G06F 11/3664; G06F 11/36; G06F 2201/865
USPC ............................................ 726/22; 713/164
See application file for complete search history.

(56) References Cited

U.S. PATENT DOCUMENTS

| | | | | | |
|---|---|---|---|---|---|
| 6,006,328 | A | * | 12/1999 | Drake | 726/23 |
| 8,843,895 | B2 | * | 9/2014 | McFadden et al. | 717/124 |
| 2004/0078784 | A1 | * | 4/2004 | Bates et al. | 717/129 |
| 2007/0297610 | A1 | * | 12/2007 | Chen et al. | 380/270 |
| 2008/0168562 | A1 | * | 7/2008 | Haga et al. | 726/23 |
| 2010/0020968 | A1 | * | 1/2010 | Jin et al. | 380/200 |

* cited by examiner

*Primary Examiner* — Ali Abyaneh
(74) *Attorney, Agent, or Firm* — Dennemeyer & Associates, LLC

(57) ABSTRACT

Applications that have the ability to be debugged also provide an access to violate the security of the application. The present invention provides a means to ensure that the debugging aspects of an application can be defeated after development and other test procedures, to keep persons or other applications from starting a debugging procedure that can lead to the discovery of secured or sensitive information and data. The application of the present invention is greatly automated such that anyone beginning a debugging program against the application in a device will be stymied by the application shutting down the debugging before data or other sensitive information can be released.

6 Claims, 4 Drawing Sheets

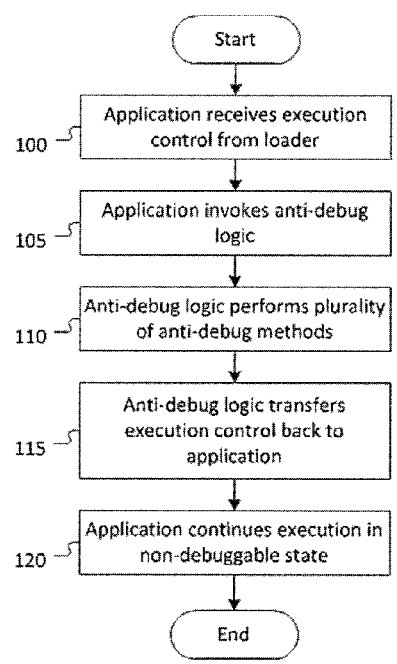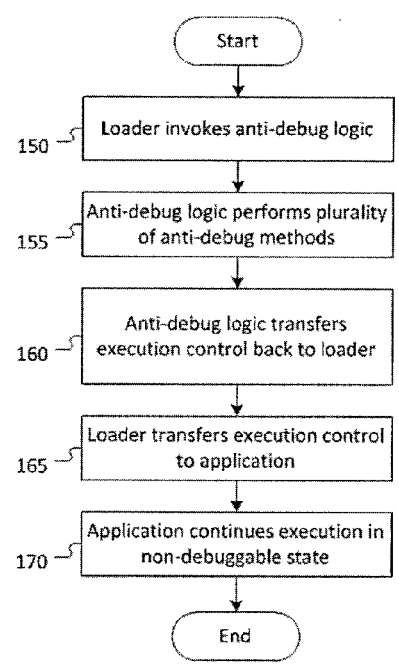
FIG 1A
FIG 1B

```
static boolean detect_threadCpuTimeNanos(){
        long start = Debug.threadCpuTimeNanos();
        for(int i=0; i<1000000; ++i)
                continue;
        long stop  = Debug.threadCpuTimeNanos();
        if(stop - start < 10000000)
                return false;
        else
                return true;
}
```

FIG 2

```
#include <dalvik/Globals.h>
JNIEXPORT jboolean JNICALL Java_com_example_disable(
        JNIENV* env, jobject dontuse){
        // gDvm == struct DvmGlobals
        gDvm.jdwpConfigured = false;
        gDvm.jdwpAllowed = false;
        return JNI_TRUE;
}
```

FIG 3

```
#include <dalvik/Globals.h>
JNIEXPORT jboolean JNICALL Java_com_example_disable (
        JNIENV* env, jobject dontuse){
        // gDvm == struct DvmGlobals
        gDvm.jdwpState = NULL;
        return JNI_TRUE;
}
```

FIG 4

```
#include <dalvik/Globals.h>
JNIEXPORT jboolean JNICALL Java_com_example_disable(
        JNIENV* env, jobject dontuse){
    // gDvm == struct DvmGlobals
    dvmHashTableLock(gDvm.dbgRegistry);
    dvmHashTableFree(gDvm.dbgRegistry);
    gDvm.dbgRegistry = dvmHashTableCreate(1000, NULL);
    dvmHashTableUnlock(gDvm.dbgRegistry);
    return JNI_TRUE;
}
```

FIG 5

```
#include <dalvik/Globals.h>
JNIEXPORT jboolean JNICALL Java_com_example_disable(
        JNIENV* env, jobject dontuse){
    // gDvm == struct DvmGlobals
    gDvm.breakpointSet = NULL;
    return JNI_TRUE;
}
```

FIG 6

```
#include <dalvik/Globals.h>
JNIEXPORT jboolean JNICALL Java_com_example_disable(
        JNIENV* env, jobject dontuse){
    // gDvm == struct DvmGlobals
    gDvm.allocRecords = NULL;
    return JNI_TRUE;
}
```

FIG 7

```
#include <dalvik/Globals.h>
JNIEXPORT jboolean JNICALL Java_com_example_disable(
       JNIENV* env, jobject dontuse){
       // gDvm == struct DvmGlobals
       gDvm.classOrgApacheHarmonyDalvikDdmcDdmServer
= NULL;
       return JNI_TRUE;
}
```

FIG 8

```
#include <dalvik/Globals.h>
JNIEXPORT jboolean JNICALL Java_com_example_disable(
       JNIENV* env, jobject dontuse){
       // gDvm == struct DvmGlobals
       while(1){
              gDvm.stepControl = NULL;
              usleep(100);
       }
       return JNI_TRUE;
}
```

FIG 9

```
#include <dalvik/Globals.h>
JNIEXPORT jboolean JNICALL Java_com_example_disable(
       JNIENV* env, jobject dontuse){
       // gDvm == struct DvmGlobals
       gDvm.methDalvikDdmcServer_dispatch = NULL;
       return JNI_TRUE;
}
```

FIG 10

MOBILE DEVICES WITH INHIBITED APPLICATION DEBUGGING AND METHODS OF OPERATION

CROSS-REFERENCES TO RELATED APPLICATIONS

The present application is a continuation of (provisional) Application No. 61/776,689; filed on Mar. 11, 2013, the full disclosures of which is incorporated herein by reference.

FIELD OF THE INVENTION

The present invention relates to mobile device application security. More specifically the present invention relates to methods and apparatus for inhibiting the use of application debugging on a mobile device application.

BACKGROUND OF THE INVENTION

It's common practice for operating systems to provide a "debugging" capability to application developers, whereby the user is given special access to application internals while the application is executing, in order to aid the user in finding application programming errors or "bugs". However, in certain situations, such mechanisms can be abused to access internal application data and internal state information that may be considered sensitive. For example, an application may be processing financial information, PIN codes, passwords, cryptography secrets, or the like, and the application (or developer thereof) may desire the user not be able to witness or access any of the application's internal state information, internal data, and other sensitive information or data.

Programmers of applications or apps for use in mobile devices, typically use application debugging and monitoring tools during application creation time to test whether an application behaves correctly. Once an application is released to typical usage environment on a mobile device (rather than a development environment), the ability to debug the application becomes less necessary. Further, in various types of applications, application debugging should be almost or completely denied, for example, for security-sensitive applications such as banking applications that handle sensitive financial data, where debugging mechanisms may pose a security risk. In particular, debugging mechanisms may compromise the security controls of the security-sensitive application and potentially allow an external entity to affect the execution of the application. As merely an example, debugging mechanisms could allow a malicious software application to attack a financial application and to gain private information usable for fraud, identity theft, or the like.

Thus the application (or developer thereof) may wish to ensure the application is not debuggable (referred to as "anti-debugging" or simply "anti-debug" in the industry), or is otherwise tamper-resistant.

It would therefore be useful to have an operation built in to an application or an operating system that would inhibit the debugging effort of a released application. Such a system would provide application developers, users of devices and managers of such devices some certainty that an application cannot be manipulated to overcome security or otherwise damage or maliciously attack the device, its operating system, sensitive information and files and other aspects of those things connected to the device or used by the users thereof.

SUMMARY OF THE INVENTION

In accordance with the present invention, a computer-implemented method for inhibiting operation of a debugging environment implemented in a mobile computing system programmed to perform the method is provided. The method includes the steps of performing in the mobile computing system, a plurality of operations specified by an executable program resident in a memory of the computing system; determining in the computing system, whether the debugging environment is active; and inhibiting performance of operations specified by the executable program, when a determination is made by the computing system that the debugging environment is active. In the method, performance of the operations specified by the executable program includes setting one or more parameters of the debugging environment when a determination is made that the debugging environment is also active. The one or more parameters can be selected from a group including: JDWP state configuration, DVM database data, DVM debugger stop point, DVM object allocation records, DVM pointers, DVM DDMS Server dispatch function.

In the present invention one method of determining whether the debugging environment is active includes the steps of initiating a timer and the execution of a plurality of functions while determining an elapsed time for execution of the plurality of functions and then determining, when the elapsed time exceeds a threshold time, that the debugging environment is active. Another method would include creating a parallel processing thread that interacts with a debugging environment. Other methods of determining whether the debugging environment is active will be apparent to those having ordinary skill in the art.

It will be understood that inhibiting performance of operations specified by the executable program includes one of more of the following: performing an action to cause the executable program to terminate; performing an action to cause the plurality of operations to execute incorrectly; inhibiting execution of the plurality of operations and initiating execution of an alternative plurality of operations; displaying to a display (to a user) an indication that the executable program is inhibited; and storing in a memory an indication that the executable program is inhibited.

In some embodiments, the present invention provides a mobile computing system for inhibiting operation of a debugging environment having a memory configured to store an executable program including a plurality of operations, a processor coupled to the memory, such that the processor is configured to execute the executable program so as to determine whether a debugging program is being executed in the mobile computing system. If such a program is active, it will be seen that the proper execution of the executable program is inhibited when the processor determines that the debugging program is being executed.

The present invention includes a number of methods that can be used separately or in combination to apply "anti-debug" or tamper-resistance to an application on a mobile device. This allows an application to handle security-sensitive data or perform security-sensitive operations under the premise the application isn't being tampered with and that the sensitive data/operations will be exposed to a third party (including potentially the local user).

Various embodiments disclose one or more software applications executed by a processor in a mobile device for detecting if a given application is currently subject to application debugging or monitoring tools. As such, the particular application or debugging operation may be inhibited.

The notion of software program tamper-resistance and anti-debug are common computer industry concepts, and as such, there exists several references concerning such as it relates to computer software. The methods taught in the present invention, however, are novel to mobile devices and mobile device applications; and are particularly appropriate to Android™ based devices. Persons having ordinary skill in the art will understand that most aspects of the invention as disclosed are coupled to an Android-based system, where such application has not existed.

Google™ Android™-based mobile computing devices, such as mobile telephones, smart phones, smart televisions, infotainment systems, tablets, smart watches, and wearable computing devices, currently represent significant worldwide mobile device market presence exceeding one billion mobile computing devices. Google Android-based mobile computing devices, also referred to as Android devices or Android compatible devices, include devices running Google Android operating system, Android Open Source Project (AOSP) operating system, an Android compatible operating system, an operating system derived from or utilizing substantial parts of the AOSP operating system, an operating system derived from or utilizing AOSP application runtime components, and an operating system advertising Android application compatibility, among others. Example Android-based operating systems and Android compatible operating systems included Amazon™ Kindle™ Fire OS™, Mozilla™ Firefox OS™, Blackberry™ OS, Baidu Yi™, Xiaomi™ MIUI, Tizen™, and Cyanogenmod™, among others.

A more detailed explanation of the invention is provided in the following description and claims and is illustrated in the accompanying drawings.

BRIEF DESCRIPTION OF THE DRAWINGS

FIG. 1A is a flow chart of the functionality of the present invention;

FIG. 1B is another flow chart of the functionality of the present invention;

FIG. 2 is code listing of the functionality of the present invention;

FIG. 3 is another code listing of the functionality of the present invention;

FIG. 4 is another code listing of the functionality of the present invention;

FIG. 5 is another code listing of the functionality of the present invention;

FIG. 6 is another code listing of the functionality of the present invention;

FIG. 7 is another code listing of the functionality of the present invention;

FIG. 8 is another code listing of the functionality of the present invention;

FIG. 9 is another code listing of the functionality of the present invention; and FIG. 10 is another code listing of the functionality of the present invention.

DETAILED DESCRIPTION OF THE ILLUSTRATIVE EMBODIMENT

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of an Illustrative Embodiment") relates to a requirement of the United States Patent Office, and should not be found to limit the subject matter disclosed herein.

Referring to FIG. 1A, a logic flow chart of the operation of one embodiment of the invention is shown. A computing application receives 100 execution control from the operation system application loader. The application invokes 105 an anti-debugging logic, which performs 110 one or more methods to inhibit or interfere with the debugging of the application. After performing 110 the one or more methods, the anti-debugging logic transfers 115 execution control back to the application. The application continues execution 120 in a non-debuggable state. The methods to inhibit or interfere with the debugging of the application will be further illustrated.

Referring now to FIG. 1B, a logic flow chart of the operation of an alternate embodiment of the invention is shown. An operation system loader invokes 150 an anti-debugging logic, which performs 155 one or more methods to inhibit or interfere with the debugging of the application. After performing 155 the one or more methods, the anti-debugging logic transfers 160 execution control back to the operating system loader. The operating system loader transfers 165 execution control to the application and the application continues execution 170 in a non-debuggable state. The methods to inhibit or interfere with the debugging of the application will be further illustrated. In FIG. 1B, the operating system loader is responsible for invoking the anti-debugging logic external to the application, whereas in FIG. 1A, the application is responsible for invoking the anti-debugging logic.

Referring now to FIG. 2, a code listing of one aspect of the invention is shown. The code listing embodies a method that involves taking a nano-second granular time snapshot, performing a large number of very fast operations (such as one million operations), then taking another nano-second granular time snapshot. The method would then determine whether the amount of time to perform the large amount of operations was suitably minimal. If a debugger or debugging environment is actively present for the application on a mobile device, the debugging mechanism overhead would introduce additional time overhead for each operation. Accordingly, if the elapsed computation time exceeded a threshold amount of time, or the like, the presence of a debugger or debugging environment on the mobile device may be inferred.

Referring now to FIG. 3, a code listing of one aspect of the invention is shown. The code listing embodies a method for an Android operating system, the virtual machine is known as the "Dalvik Virtual Machine" or "DVM". One technical debugging mechanism implemented by the DVM is the (industry name) "Java Debug Wire Protocol" or "JDWP", which includes an interactive protocol for an external entity to debug an application running on the DVM. In various embodiments, the mobile device application can embody a method of directly accessing DVM internal structures. This is something that is not typically performed by Android mobile applications. In the method shown in the code listing, the method performs specific calls in the DVM to explicitly disallow and unconfigure the use of the of the JDWP mechanism.

Referring now to FIG. 4, a code listing of one aspect of the invention is shown. The code listing embodies a method involving the access to the DVM internal structures and explicitly changing a JDWP state configuration value to an invalid value. This change in configuration would typically cause the DVM to crash, when an entity attempts to enter a debugging state for the mobile device application.

Referring now to FIG. 5, a code listing of one aspect of the invention is shown. The code listing embodies a method involving the access of the DVM internal structures and explicitly erasing DVM internal information database data. For example, the "debug registry" of the DVM may be changed. By erasing such data, a subsequent attempt to debug the mobile device application may lack the necessary information to successfully perform debugging.

Referring now to FIG. 6, a code listing of one aspect of the invention is shown. The code listing embodies a method involving the access of the DVM internal structures and explicitly changing the DVM internal debugger stop point. For example, a "breakpoint," known in the industry, may be set to an invalid value. In various embodiments, an invalid value may cause the DVM to crash when an entity attempts to run a debugging state on the target mobile device application.

Referring now to FIG. 7, a code listing of one aspect of the invention is shown. The code listing embodies a method involving the access of the DVM internal structures and explicitly changing the DVM object allocation records. For example, a record of data structures created by the mobile device application may be changed. In operation, a debugger uses this allocation record to understand details of allocated objects, accordingly, an invalid value will interfere with the debugger's ability to identify and interpret allocated objects. This may cause the DVM to operate improperly and interfere with the debugging operations.

Referring now to FIG. 8, a code listing of one aspect of the invention is shown. The code listing embodies a method involving the access of the DVM internal structures and explicitly changing the DVM pointer to the DDM client class. This class typically contains the software operational logic to implement the operations necessary to perform a debugging session. By changing the value of the class, the class (and the operational logic it embodies) is no longer available for use, and the debugging session would be interrupted.

Referring now to FIG. 9, a code listing of one aspect of the invention is shown. The code listing embodies a method involving the creation of a new execution thread (which executes to the target mobile device software application in parallel). In the illustrated code listing, the new thread accesses the DVM internal structures, and explicitly changes the DVM debugger step control data value. In various embodiments, a periodic or continuous change in such values will interfere with a debugging session attempting to control execution steps.

Referring now to FIG. 10, a code listing of one aspect of the invention is shown. The code listing embodies a method involving the access to the DVM internal structures and explicitly changing the DVM DDMC Server dispatch function to an invalid value. By changing the value, the attempt to create a debugging session by the use of the DDMS protocol may cause the target mobile device application to crash.

Various embodiments of the invention are disclosed herein to incorporate one or more specific technical methods that individually or in combination, inhibit application debugging on a mobile device. In some examples, these techniques may be utilized by mobile software applications running upon a mobile device, such as an Android-compatible mobile device, an iOS device, or the like. In various embodiments, the techniques described herein enable applications to have a higher level of tamper-resistance.

In one embodiment, a mobile device application may include time-sensitive computations and comparisons that would expose the presence of a debugging environment. In another embodiment, a mobile device application may include calling on debugging-specific application programming interfaces (APIs). For example, one method involves the main mobile-device application logic taking a nano-second granular time snapshot, and creating a parallel executing "Thread" that is tasked with calling of an API specific to a debugging environment. In one specific example, thread may call an API such as "waitForDebugger" or the like, and then terminate. Subsequently, the main application performs a time-bounded wait for the parallel Thread to end execution. In various embodiments, if the parallel Thread does not end execution before the time boundary on the wait operation expires, it implies that a debugger is not attached to the application. In such cases, the mobile device application can continue to operate as normal. However, if the parallel Thread does end execution before the time boundary on the wait operation expires, that implies that a debugger is attached to the mobile device application.

In such cases the mobile device application may then execute alternate application functionality or logic as appropriate to respond to the situation. In some cases, the mobile device application may exit, the mobile device application redirects operation to invalid data, e.g. a honeypot, an alert may be provided to an individual, an organization (e.g. security company, an ISP), or the like.

Other embodiments include working directly with an underlying application execution virtual machine. In the Android operating system, the virtual machine is known as the "Dalvik Virtual Machine" or "DVM". The DVM contains internal data structures that relate to the operation of the application and the debugging of the application. It is not typical for an Android mobile application to access these internal data structures. In various embodiments, methods can be used to manipulate or modify the DVM internal data structures to inhibit or alter application debugging behavior.

By incorporating one or more methods to disrupt the ability to debug the application, a target mobile device application can: detect and respond reactively to the use of a debugger against the target mobile device application. In some embodiments, such operations may lead the application to abnormally behave or crash. These types of anomalous behaviors reduce or prevent the debugger from operating properly in a manner that may access mobile device application data. Accordingly, in various embodiments, a certain level of tamper reduction or tamper-resistance of mobile device applications is achieved.

In various embodiments, a processor in a mobile device is programmed to perform such methods via software resident upon the mobile device. A typical mobile device may be a smart-device, such as an Android-phone, Android-tablet, or the like. In light of the above disclosure, one of ordinary skill in the art will recognize that embodiments may be possibly applied to other devices, such as the Apple iOS devices, in the future.

Some examples of the operation of the invention and the types of systems and applications that it can be used for are provided as follows; it will be understood that these examples are meant to be illustrative of the invention but are not limiting. In these examples, the invention is used in association with a target software application consisting of a plurality of machine instructions, executing on a computing device consisting of one or more of: central processing units, a memory, a storage medium (for storage of executable programs), with that computing device executing the Android operating system. The target software application embodies specific machine instructions that represent one or more methods to detect or prevent the use of application debugging software.

In one method the steps of taking a nano-second time measurement, performing a large number of simple processing operations, taking another nano-second time measurement, computing the elapsed nano-second time measurement from the two previous time measurements, comparing the elapsed nano-second time measurement against a pre-determined time measurement threshold value. If the elapsed nano-second time measurement, as compared to the pre-determined time measurement threshold value, is less than the threshold, then the target software application continues to operate as normal using the normal software logic. If the elapsed nano-second time measurement, as compared to the pre-determined time measurement threshold value, is greater than the threshold, then the target software application uses an alternative software logic operation. Examples of the alternative software logic operation could be one or more of: exit the target software application, crash the target software application, show or display information to the user, transmit a message to a remote entity, write a piece of data to a persistent or non-persistent storage medium.

Another method involves the steps of creating a parallel execution object (named a "Thread") by the target software application; tasking the Thread to execute the "waitForDebugger" logical operation then end Thread execution; the main software application performing a time-bounded wait for the parallel executing Thread to end execution; determining if the parallel executing Thread ended execution before the time-bounded limit on the wait expired. If the time-bounded limit on the wait expired before the parallel executing Thread ended execution, then the target software application continues to operate as normal using the normal software logic. If the parallel executing Thread ended execution before the time-bounded limit on the wait expired, then the target software application uses an alternative software operation.

Examples of the alternative software logic operation could be one or more of: exit the target software application, crash the target software application, show or display information to the user, transmit a message to a remote entity, and write a piece of data to a persistent or non-persistent storage medium.

Another method involves the steps of: accessing a plurality of data values contained in the Android Dalvik Virtual Machine "DvmGlobals" logical software structure, and changing the value of existing data values to alternate values in a manner that cause the target software application to crash when a debugging session is attempted, or cause the target software application to continue to execute but prevent an accurately operating debugging session when a debugging session is attempted.

One or more of the following steps can be used with this method: setting the Android Dalvik Virtual Machine "jdwpConfigured" software logic value to a software logical "false" value, setting the Android Dalvik Virtual Machine "jdwpAllowed" software logic value to a software logical "false" value; or setting the Android Dalvik Virtual Machine "jdwpState" software logic or "breakpointSet" software logic value to an invalid value then an example of an invalid value would be zero or the software logical equivalent of "null"; or modifying the Android Dalvik Virtual Machine "dbgRegistry" software logic value to a new value.

In these steps an example of a new value would be zero or the software logical equivalent of "null"; or a new value would be determined by taking the step of executing the Android Dalvik Virtual Machine "dvmHashTableFree" logical software operation; or a new value would be determined by the result value returned by the step of executing the Android Dalvik Virtual Machine "dvmHashTableCreate" logical software operation.

Another method involves the steps of setting the Android Dalvik Virtual Machine "allocRecords" software logic value to an invalid value. An example of an invalid value would be zero or the software logical equivalent of "null". Further this method involves the steps of: setting the Android Dalvik Virtual Machine "classOrgApacheHarmonyDalvikDdmcDdmServer" software logic value to an invalid value. Here, as well an example of an invalid value would be zero or the software logical equivalent of "null"

This method involves the steps of setting the Android Dalvik Virtual Machine "methDalvikDdmcServer_dispatch" software logic value to an invalid value. An example of an invalid value would be zero or the software logical equivalent of "null"

One or more of these methods can include the steps of creating a parallel execution software object, named "Thread" in the industry; from the parallel executing Thread, accessing the Android Dalvik Virtual Machine "stepControl" software logic value contained in the Android Dalvik Virtual Machine "DvmGlobals" logical software structure; repeatedly changing the value in the "stepControl" software logic value to an invalid value. An example of an invalid value would be zero or the software logical equivalent of "null"

Although illustrative embodiments of the invention has been shown and described, it is to be understood that various modifications and substitutions may be made by those skilled in the art without departing from the novel spirit and scope of the invention.

What is claimed is:

1. A computer-implemented method for inhibiting operation of a debugging environment implemented in a mobile computing system programmed to perform the method comprising the steps of:
    performing in the mobile computing system, a plurality of operations specified by an executable program resident in a memory of the computing system;
    determining in the computing system, whether the debugging environment is active in the mobile computing system by initiating in the computer system, a timer and execution of a plurality of functions; determining in the computer system, an elapsed time for execution of the plurality of functions and determining in the computer system, that the debugging environment is active when the elapsed time exceeds a threshold time;
    inhibiting performance in the mobile computing system, performance of operations specified by the executable program, by inhibiting in the computer system, execution of the plurality of operations and initiating in the computer system, execution of an alternative plurality of operations, when the determination is made by the computing system that the debugging environment is active;
    wherein inhibiting performance in the mobile computing system, performance of the operations specified by the executable program comprises setting in the computing system, one or more parameters of the debugging environment, when the determination is made by the computing system that the debugging environment is active; and
    wherein the one or more parameters is selected from a group consisting of: Java™ Debug Wire Protocol (JDWP) state configuration, Dalvik Virtual Machine (DVM) database data, DVM debugger stop point, DVM object allocation records, DVM pointers, DVM Dalvik Debug Monitor Server (DDMS) Server dispatch function.

2. The computer-implemented method of claim 1 wherein inhibiting performance in the mobile computing system, performance of operations specified by the executable program comprises the step of performing in the computer system, an action to cause the executable program to terminate.

3. The computer-implemented method of claim 1 wherein inhibiting performance in the mobile computing system, performance of operations specified by the executable program comprises the step of performing in the computer system, an action to cause the plurality of operations to execute incorrectly.

4. The computer-implemented method of claim 1 wherein inhibiting performance in the mobile computing system, performance of operations specified by the executable program comprises the steps of displaying to a display in the mobile computing system an indication that the executable program is inhibited to a user.

5. The computer-implemented method of claim 1 wherein inhibiting performance in the mobile computing system, performance of operations specified by the executable program comprises the step of storing in a memory in the mobile computing system an indication that the executable program is inhibited.

6. The computer-implemented method of claim 1 wherein determining in the computing system, whether the debugging environment is active in the mobile computing system comprises the step of creating with the mobile computing system, a parallel processing thread, to a processing thread of the executable program, that interacts with a debugging environment.

* * * * *